US008629220B2

(12) United States Patent
Prusty et al.

(10) Patent No.: US 8,629,220 B2
(45) Date of Patent: Jan. 14, 2014

(54) HYDROLYSIS-RESISTANT POLYAMIDES

(75) Inventors: Manoranjan Prusty, Mannheim (DE);
Arno Lange, Bad Dürkheim (DE);
Claus Gabriel, Griesheim (DE);
Matthias Scheibitz, Weinheim (DE)

(73) Assignee: BASF SE (DE)

( * ) Notice: Subject to any disclaimer, the term of this patent is extended or adjusted under 35 U.S.C. 154(b) by 172 days.

(21) Appl. No.: 13/351,664

(22) Filed: Jan. 17, 2012

(65) Prior Publication Data

US 2012/0184664 A1 Jul. 19, 2012

Related U.S. Application Data

(60) Provisional application No. 61/433,551, filed on Jan. 18, 2011.

(51) Int. Cl.
*C08L 77/00* (2006.01)
*C08F 210/10* (2006.01)
(52) U.S. Cl.
USPC ........... 525/426; 524/502; 524/538; 525/435; 525/451; 526/272; 526/279; 526/348.3; 526/348.8; 528/32; 528/396; 528/405
(58) Field of Classification Search
USPC .................. 524/502, 538; 525/426, 435, 451; 526/272, 279, 348.3, 348.8; 528/32, 528/396, 405
See application file for complete search history.

(56) References Cited

U.S. PATENT DOCUMENTS

| | | | |
|---|---|---|---|
| 2,071,250 A | 2/1937 | Carothers | |
| 2,071,251 A | 2/1937 | Carothers | |
| 2,130,523 A | 9/1938 | Carothers | |
| 2,130,948 A | 9/1938 | Carothers | |
| 2,241,322 A | 5/1941 | Hanford | |
| 2,312,966 A | 3/1943 | Hanford | |
| 2,512,606 A | 6/1950 | Bolton | |
| 3,393,210 A | 7/1968 | Speck | |
| 3,423,376 A * | 1/1969 | Gobran et al. | 526/279 |
| 4,148,846 A | 4/1979 | Owens et al. | |
| 4,152,499 A * | 5/1979 | Boerzel et al. | 525/381 |
| 4,360,617 A | 11/1982 | Müller et al. | |
| 4,396,742 A | 8/1983 | Binsack et al. | |
| 4,537,949 A | 8/1985 | Schmidt et al. | |
| 4,540,772 A | 9/1985 | Pipper et al. | |
| 4,628,069 A | 12/1986 | Meyer et al. | |
| 4,745,146 A | 5/1988 | Meyer et al. | |
| 4,771,109 A | 9/1988 | Eichenauer et al. | |
| 4,882,381 A | 11/1989 | Wittmann et al. | |
| 5,010,135 A | 4/1991 | Eckel et al. | |
| 6,194,538 B1 | 2/2001 | Weiss et al. | |
| 6,284,716 B1 * | 9/2001 | Gunther et al. | 508/235 |
| 6,380,316 B1 * | 4/2002 | Bahadur et al. | 525/263 |
| 6,699,960 B1 | 3/2004 | Ohlbach et al. | |
| 2006/0235191 A1 | 10/2006 | Deininger et al. | |
| 2007/0048672 A1 * | 3/2007 | Choi et al. | 430/311 |
| 2009/0012229 A1 | 1/2009 | Desbois et al. | |
| 2009/0300946 A1 | 12/2009 | Egbers et al. | |
| 2010/0090174 A1 | 4/2010 | Weber et al. | |
| 2010/0192814 A1 | 8/2010 | Herzog et al. | |
| 2010/0261818 A1 | 10/2010 | Seki | |

FOREIGN PATENT DOCUMENTS

| | | |
|---|---|---|
| DE | 2702661 | 8/1977 |
| DE | 37 25 576 A1 | 2/1989 |
| DE | 38 00 603 A1 | 7/1989 |
| DE | 41 20 661 A1 | 12/1992 |
| DE | 44 13 177 A1 | 10/1995 |
| DE | 10313681 A1 | 10/2004 |
| DE | 10 2006 045 869 A1 | 4/2008 |
| DE | 101 755 19.7 | 9/2010 |
| EP | 0038094 A2 | 10/1981 |
| EP | 0038582 A2 | 10/1981 |
| EP | 0039524 A1 | 11/1981 |
| EP | 0 050 265 A1 | 4/1982 |
| EP | 112 542 A2 | 7/1984 |
| EP | 129195 A2 | 12/1984 |
| EP | 129196 A2 | 12/1984 |
| EP | 224 847 A2 | 6/1987 |
| EP | 235690 A2 | 9/1987 |
| EP | 240 887 A2 | 10/1987 |
| EP | 299444 A2 | 1/1989 |
| EP | 0319290 A2 | 6/1989 |
| EP | 922065 A2 | 6/1999 |
| EP | 1198491 A1 | 4/2002 |
| EP | 1984438 A1 | 10/2008 |
| EP | 1994075 A2 | 11/2008 |

(Continued)

OTHER PUBLICATIONS

U.S. Appl. No. 61/370,473.

(Continued)

*Primary Examiner* — Richard A Huhn
(74) *Attorney, Agent, or Firm* — Novak Druce Connolly Bove + Quigg LLP

(57) ABSTRACT

Thermoplastic molding compositions comprising
A) from 10 to 99.9% by weight of a thermoplastic polyamide,
B) from 0.1 to 20% by weight of a terpolymer obtainable via copolymerization of
 (B1) from 1 to 70% by weight of at least one electron-deficient olefin,
 (B2) from 0 to 85% by weight of at least one olefin which, at its olefinic double bond, bears only hydrogen atoms and/or carbon atoms without electron-withdrawing substituents, and
 (B3) from 1 to 99% by weight of at least one alkoxyvinylsilane,
C) from 0 to 50% by weight of a fibrous or particulate filler or a mixture of these,
D) from 0 to 50% by weight of other additives,
where the total of the percentages by weight of components A) to D) is 100%.

14 Claims, No Drawings

(56) References Cited

FOREIGN PATENT DOCUMENTS

| | | | | |
|---|---|---|---|---|
| EP | 2 100 919 A1 | 9/2009 | | |
| EP | 2223904 A2 | 9/2010 | | |
| JP | 61211363 A * | 9/1986 | ............. | C08L 77/00 |
| JP | 2009 155436 A | 7/2009 | | |
| WO | WO 8805449 A1 * | 7/1988 | ............. | C08L 23/00 |
| WO | WO-2008074687 A2 | 6/2008 | | |
| WO | WO-2011003773 A1 | 1/2011 | | |
| WO | WO-2011051121 A1 | 5/2011 | | |

OTHER PUBLICATIONS

U.S. Appl. No. 13/193,886.
U.S. Appl. No. 61/423,614.
U.S. Appl. No. 61/420,797.

* cited by examiner

HYDROLYSIS-RESISTANT POLYAMIDES

CROSS-REFERENCE TO RELATED APPLICATIONS

This application claims benefit (under 35 USC 119(e)) of U.S. Provisional Application 61/433,551, filed Jan. 18, 2011, which is incorporated by reference.

The invention relates to thermoplastic molding compositions comprising
A) from 10 to 99.9% by weight of a thermoplastic polyamide,
B) from 0.1 to 20% by weight of a co- or terpolymer obtainable via copolymerization of
   (B1) from 1 to 70% by weight of at least one electron-deficient olefin,
   (B2) from 0 to 85% by weight of at least one olefin which, at its olefinic double bond, bears only hydrogen atoms and/or carbon atoms without electron-withdrawing substituents, and
   (B3) from 1 to 99% by weight of at least one alkoxyvinylsilane,
C) from 0 to 50% by weight of a fibrous or particulate filler or a mixture of these,
D) from 0 to 50% by weight of other additives,
where the total of the percentages by weight of components A) to D) is 100%.

The invention further relates to the use of the molding compositions of the invention for producing fibers, foils, and moldings of any type, and also to the resultant moldings.

It is known that thermoplastically processible polyamides are capable of absorbing water. However, this process can reduce the strength and stiffness of the products by as much as 50%.

Examples of hydrolysis stabilizers are inter alia the phenolic compounds revealed in EP-A 112 542, EP-A 224 847, EP-A 240 887 and, DE-A 41 20 661.

Disadvantages with these low-molecular-weight substances are volatility (undesired for toxicological reasons) and the formation of deposit on the mold during processing, and also relatively low heat resistance.

Processes for producing terpolymers B) are proposed in the relatively recent EP (file reference 101 755 19.7), as also are applications, but these differ from those of the invention.

It was therefore an object of the present invention to provide thermoplastic polyamide molding compositions which have improved HAR and good surface after hydrolytic aging, and also good mechanical properties.

Accordingly, the molding compositions defined in the introduction have been discovered. The dependent claims give preferred embodiments.

The molding compositions of the invention comprise, as component A), from 10 to 99.9% by weight, preferably from 20 to 98% by weight, and in particular from 25 to 94% by weight, of at least one polyamide.

The viscosity number of the polyamides of the inventive molding compositions is generally from 90 to 350 ml/g, preferably from 110 to 240 ml/g, determined on a 0.5% strength by weight solution in 96% strength by weight sulfuric acid at 25° C. to ISO 307.

Preference is given to semicrystalline or amorphous resins whose molecular weight (weight-average) is at least 5000, for example those described in the American patent specifications U.S. Pat. Nos. 2,071,250, 2,071,251, 2,130,523, 2,130,948, 2,241,322, 2,312,966, 2,512,606, and 3,393,210.

Examples of these are polyamides which derive from lactams having from 7 to 13 ring members, e.g. polycaprolactam, polycaprylolactam and polylaurolactam, and also polyamides obtained via reaction of dicarboxylic acids with diamines.

Dicarboxylic acids which may be used are alkanedicarboxylic acids having from 6 to 12, in particular from 6 to 10, carbon atoms, and aromatic dicarboxylic acids. Acids which may be mentioned here merely as examples are adipic acid, azelaic acid, sebacic acid, dodecanedioic acid and terephthalic and/or isophthalic acid.

Particularly suitable diamines are alkanediamines having from 6 to 12, in particular from 6 to 8, carbon atoms, and also m-xylylenediamine (e.g. Ultramid® X17 from BASF SE, using a 1:1 molar ratio of MXDA to adipic acid), di(4-aminophenyl)methane, di(4-aminocyclohexyl)methane, 2,2-di(4-aminophenyl)propane, 2,2-di(4-aminocyclohexyl)propane or 1,5-diamino-2-methylpentane.

Preferred polyamides are polyhexamethyleneadipamide, polyhexamethylenesebacamide and polycaprolactam, and also nylon-6/6,6 copolyamides, in particular having a proportion of from 5 to 95% by weight of caprolactam units (e.g. Ultramid® C31 from BASF SE).

Other suitable polyamides are obtainable from ω-aminoalkyl nitriles, e.g. aminocapronitrile (PA 6) and adipodinitrile with hexamethylenediamine (PA 66) via what is known as direct polymerization in the presence of water, for example as described in DE-A 10313681, EP-A 1198491 and EP 922065.

Mention may also be made of polyamides obtainable, by way of example, via condensation of 1,4-diaminobutane with adipic acid at an elevated temperature (nylon-4,6). Preparation processes for polyamides of this structure are described by way of example in EP-A 38 094, EP-A 38 582, and EP-A 39 524.

Other suitable examples are polyamides obtainable via copolymerization of two or more of the abovementioned monomers, and mixtures of two or more polyamides in any desired mixing ratio. Mixtures of nylon 66 with other polyamides are particularly preferred, and particular preference is given here to nylon-6/6,6 copolyamides.

Other polyamides which have proven particularly advantageous are semiaromatic copolyamides, such as PA 6/6T and PA 66/6T, where the triamine content of these is less than 0.5% by weight, preferably less than 0.3% by weight (see EP-A 299 444). EP-A 19 94 075 discloses further high-temperature-resistant polyamides (PA 6T/6I/MXD6).

The processes described in EP-A 129 195 and 129 196 can be used to prepare the preferred semiaromatic copolyamides with low triamine content.

The following list, which is not comprehensive, comprises the polyamides A) mentioned and other polyamides A) for the purposes of the invention, and the monomers present:

AB Polymers:

| | |
|---|---|
| PA 4 | Pyrrolidone |
| PA 6 | ε-Caprolactam |
| PA 7 | Ethanolactam |
| PA 8 | Caprylolactam |
| PA 9 | 9-Aminopelargonic acid |
| PA 11 | 11-Aminoundecanoic acid |
| PA 12 | Laurolactam |

AA/BB Polymers

| | |
|---|---|
| PA 46 | Tetramethylenediamine, adipic acid |
| PA 66 | Hexamethylenediamine, adipic acid |
| PA 69 | Hexamethylenediamine, azelaic acid |
| PA 610 | Hexamethylenediamine, sebacic acid |
| PA 612 | Hexamethylenediamine, decanedicarboxylic acid |
| PA 613 | Hexamethylenediamine, undecanedicarboxylic acid |
| PA 1212 | 1,12-Dodecanediamine, decanedicarboxylic acid |
| PA 1313 | 1,13-Diaminotridecane, undecanedicarboxylic acid |
| PA 6T | Hexamethylenediamine, terephthalic acid |
| PA 9T | 1,9-Nonanediamine, terephthalic acid |
| PA MXD6 | m-Xylylenediamine, adipic acid |
| PA 6I | Hexamethylenediamine, isophthalic acid |
| PA 6-3-T | Trimethylhexamethylenediamine, terephthalic acid |
| PA 6/6T | (see PA 6 and PA 6T) |
| PA 6/66 | (see PA 6 and PA 66) |
| PA 6/12 | (see PA 6 and PA 12) |
| PA 66/6/610 | (see PA 66, PA 6 and PA 610) |
| PA 6I/6T | (see PA 6I and PA 6T) |
| PA PACM 12 | Diaminodicyclohexylmethane, laurolactam |
| PA 6I/6T/PACM | as 6I/6T + diaminodicyclohexylmethane |
| PA 12/MACMI | Laurolactam, dimethyldiaminodicyclohexylmethane, isophthalic acid |
| PA 12/MACMT | Laurolactam, dimethyldiaminodicyclohexylmethane, terephthalic acid |
| PA PDA-T | Phenylenediamine, terephthalic acid |

The molding compositions according to the invention comprise, as component B), from 0.1 to 20% by weight, preferably from 0.1 to 10% by weight, and in particular from 0.2 to 5% by weight, of a co- or terpolymer B) according to claim 1.

Component (B1) used usually comprises, as monomers, those olefins which bear, in α-position with respect to the olefinic double bond, one or more electron-withdrawing substituents which (e.g. by way of the conjugation of the π-electron systems) reduce the electron density of the olefinic double bond. In one preferred embodiment, the at least one electron-deficient olefin of component (B) bears, at its olefinic double bond, at least one, in particular one or two, electron-withdrawing substituent(s) selected from the group of —CO— (carbonyl), —CN (cyano), —NO$_2$ (nitro), and —SO$_2$— (sulfo). The group —CO— here is generally a constituent of a keto function, of an aldehyde function, or especially of a carboxy function in the form of, for example, a free carboxylic acid, of a carboxylic ester, of a carboxamide, of a carboximide, or of a cyclic or noncyclic carboxylic anhydride. The group —SO$_2$— here is generally a constituent of a sulfone function, of a sulfonic acid, of a sulfonic ester, of a sulfonamide, or of a sulfonimide.

Typical examples of these electron-deficient olefins of component (B1) are acrylic acid, esters thereof, such as methyl acrylate, ethyl acrylate, or n-butyl acrylate, amides thereof and imides thereof, acrylonitrile, methacrylic acid, esters thereof, such as methyl methacrylate, ethyl methacrylate, or n-butyl methacrylate, amides thereof and imides thereof, methacrylonitrile, maleic acid, the mono- and diesters thereof, e.g. monomethyl maleate, dimethyl maleate, monoethyl maleate, or diethyl maleate, mono- and diamides thereof, imides thereof, and mono- and dinitrile thereof, and also fumaric acid, mono- and diesters thereof, e.g. monomethyl fumarate, dimethyl fumarate, monoethyl fumarate, or diethyl fumarate, mono- and diamides thereof, and mono- and dinitrile thereof. Ester alcohol radicals that can be used, and possible substituents that can be used on the abovementioned amides and imides, are primarily $C_1$- to $C_{20}$-alkyl radicals. It is also possible to use a mixture of the abovementioned electron-deficient olefins as component (B1).

Very particular preference is given to a co- or terpolymer which is obtainable from at least one anhydride of a monoethylenically unsaturated $C_4$- to $C_6$-dicarboxylic acid, as component (B1). Compounds that can in particular be used here are the anhydrides which have a cyclic structure and which derive from fumaric acid, itaconic acid, mesaconic acid, methylenemalonic acid, citraconic acid, and especially maleic acid.

In order to influence properties such as solubility, a component (B2) can also be used. Component (B2) used usually comprises, as monomers, those olefins which bear, in α-position with respect to the olefinic double bond, only carbon atoms without electron-withdrawing substituents, and/or hydrogen atoms. Here, in contrast to component (B1), there is no reduction in electron density of the olefinic double bond caused by conjugation with a π-electron system of a carbonyl (—CO), cyano (—CN), nitro (—NO$_2$), or sulfo group (—SO$_2$—). The olefins of component (B2) are mostly pure hydrocarbon compounds which at most can bear an electron-withdrawing substituent, such as —CO—, —CN, —NO$_2$, or —SO$_2$—, at a position relatively distant from the olefinic double bond, i.e. in the β-position or at a still greater distance. It is also possible to use a mixture of the abovementioned non-electron-deficient olefins as component (B2).

Typical examples of such non-electron-deficient olefins of component (B2) are cyclic olefins, such as cyclopentene, cyclohexene, or cycloheptene, α-olefins, such as ethylene, propylene, 2-methylpropene (isobutene), 1-butene, 1-hexene, 1-octene, 2,2,4-trimethyl-1-pentene, 1-decene, or 1-dodecene, vinylaromatics, such as styrene, α-methylstyrene, or $C_1$- to $C_4$-alkyl-styrenes, for example 2-, 3-, and 4-methylstyrene, and also 4-tert-butylstyrene, and also oligomers and polymers derived from these α-olefins; other examples are olefins having an internal double bond, e.g. 2-butene, and copolymers of various α-olefins, e.g. the copolymer of isobutene and 1-decene, or of isobutene and styrene, or of α-methylstyrene, or of $C_1$- to $C_4$-alkylstyrenes. The abovementioned oligomers and polymers mostly have terminal olefinic double bonds which derive mainly from chain-termination reactions, and which allow them to undergo further polymerization for the purposes of the present invention.

Among the α-olefin polymers, polyisobutene is particularly important since it is a commercially available material that is frequently used in industry. It has long been known that polyisobutene can be produced via polymerization of isobutene with Lewis acids, such as aluminum trichloride, boron trifluoride, or titanium tetrachloride, as catalyst. Reaction temperature, catalyst, and purity of the isobutene used affect the product, which can be low-molecular-weight, medium-molecular-weight, or high-molecular weight polyisobutene. An overview of processes for producing polyisobutene is also found in Ullmann's Encyclopedia of Industrial Chemistry, 5th Edition, Vol. A 21, 1992, pp. 555 to 561. Kennedy and Ivan in "Carbocationic Macromolecular Engineering", Hanser-Verlag, 1991 describe further processes (living polymerization) for producing polyisobutene. Isobutene copolymers are important as component (B2), alongside isobutene homopolymers.

One preferred embodiment of the present invention is a terpolymer which is obtainable from an isobutene homo- or copolymer having a number-average molecular weight $M_n$ of from 100 to 500 000, preferably from 120 to 50 000, in particular from 350 to 20 000, especially from 500 to 2500, as component (B2). For the purposes of the present invention, the term "isobutene homopolymer" also covers oligomeric isobutenes, such as dimeric, trimeric, tetrameric, pentameric, hexameric, and heptameric isobutene.

In principle, any of the familiar and commercially available polyisobutenes can be used as isobutene homo- or copolymer. Polyisobutenes that are familiar and commercially available are mostly isobutene homopolymers or isobutene copolymers having a predominant portion of isobutene units [—$CH_2$—C($CH_3$)$_2$—]. It is preferable to use what is known as a "reactive" polyisobutene. "Reactive" polyisobutenes differ from the "low-reactivity" polyisobutenes in having higher content of terminally arranged double bonds. Reactive polyisobutenes therefore comprise at least 50 mol % of these terminally arranged double bonds, based on the total number of the polyisobutene macromolecule units. Particular preference is given to polyisobutenes having at least 60 mol %, and in particular having at least 80 mol %, based on the total number of polyisobutene macromolecule units, of terminally arranged double bonds. The terminally arranged double bonds can be either vinyl double bonds [—CH=C($CH_3$)$_2$] (β-olefin) or else vinylidene double bonds [—CH—C(=$CH_2$)—$CH_3$] (α-olefin).

One preferred embodiment of the present invention is a terpolymer which is obtainable from an isobutene homo- or copolymer having at least 60%, in particular at least 80 mol %, content of terminal vinylidene double bonds, as component (B2).

The materials used are mostly isobutene homo- or copolymers which have uniform or substantially uniform polymer skeletons. For the purposes of the present invention, this usually means those polymers composed of at least 85% by weight of isobutene units [—$CH_2$—C($CH_3$)$_2$—], preferably at least 90% by weight, and in particular at least 95% by weight.

The isobutene homo- or copolymers used as components (B2) moreover usually have a polydispersity index (PDI) of from 1.05 to 10, in particular from 1.05 to 4, especially from 1.05 to 2.0. The polydispersity means the quotient calculated from weight-average molecular $M_w$ and number-average molecular weight $M_n$ (PDI=$M_w/M_n$).

For the purposes of the present invention, the expression isobutene homo- or copolymers also covers polymers which are obtainable via cationic or living cationic polymerization and which preferably comprise at least 60% by weight of isobutene, particularly preferably at least 80% by weight, more preferably at least 90% by weight, and especially at least 95% by weight of isobutene. These polymers can also comprise, incorporated into the polymer, other butene isomers, such as 1- or 2-butene, and also olefinically unsaturated monomers which differ therefrom but which are copolymerizable with isobutene under cationic polymerization conditions.

Accordingly, suitable isobutene starting materials for producing isobutene homo- or copolymers, where these can serve as starting materials for the present invention, are not only isobutene itself but also isobutene-containing $C_4$-hyrocarbon streams, for example $C_4$-raffinates, and $C_4$-cuts from isobutene dehydrogenation, and $C_4$-cuts from steam crackers, and from FCC ("fluid catalyzed cracking") crackers, to the extent that these have been freed substantially from 1,3-butadiene comprised therein. Particularly suitable $C_4$-hydrocarbon streams generally comprise less than 500 ppm of butadiene, preferably less than 200 ppm. If $C_4$-cuts are used as starting material, the hydrocarbons other than isobutene can assume the function of an inert solvent.

Monomers that can be used for isobutene copolymers and that are copolymerizable under cationic polymerization conditions comprise vinylaromatics, such as styrene and α-methyl-styrene, $C_1$- to $C_4$-alkylstyrenes, such as 2-, 3-, and 4-methylstyrene, and also 4-tert-butylstyrene and isoolefins having from 5 to 10 carbon atoms, e.g. 2-methyl-1-butene, 2-methyl-1-pentene, 2-methyl-1-hexene, 2-ethyl-1-pentene, 2-ethyl-1-hexene, and 2-propyl-1-heptene.

Polyisobutenes suitable as component (B2) are any of the isobutene homo- or copolymers obtainable via familiar cationic or living cationic polymerization. However, preference is given to what are known as "reactive" polyisobutenes, where these have been described above.

Examples of polyisobutenes that are commercially available and are suitable as component (B2) are the Glissopal® grades from BASF SE, e.g. Glissopal 550, Glissopal 1000, and Glissopal 2300 (where the Glissopal grades are reactive polyisobutenes), and also the Oppanol® grades from BASF SE, e.g. Oppanol B10, B12, and B15.

Suitable alkoxyvinylsilanes for monomer component (B2) are preferably compounds of the general formula I

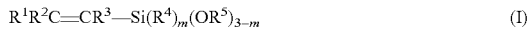

$$R^1R^2C=CR^3-Si(R^4)_m(OR^5)_{3-m} \quad (I)$$

in which m is the number 0, 1, or 2, $R^1$, $R^2$, $R^3$, $R^4$, and $R^5$ can be identical or different and are $C_1$- to $C_{20}$-alkyl, $C_5$- to $C_{20}$-cycloalkyl, $C_6$- to $C_{20}$-aryl, or $C_7$ to $C_{20}$-aralkyl radicals, where $R^1$, $R^2$, $R^3$, and $R^4$ can also be hydrogen.

For the purposes of explanation of the present invention, in particular for specification of components (B1) and (B3), the expression "$C_1$- to $C_{20}$-alkyl" covers corresponding straight-chain and branched alkyl groups. These are preferably straight-chain or branched $C_1$- to $C_{10}$-alkyl, in particular $C_1$- to $C_8$-alkyl, and especially $C_1$- to $C_4$-alkyl groups. Examples of these alkyl groups are methyl, ethyl, propyl, isopropyl, n-butyl, 2-butyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,2-dimethyl-butyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 2-ethylpentyl, 1-propylbutyl, n-octyl, 2-ethylhexyl, 2-propylheptyl, n-nonyl, and n-decyl.

Other suitable alkyl radicals of this type are analogous hydrocarbyl radicals, where these can have interruption by heteroatoms, such as oxygen, or can have incorporated aromatic or heterocyclic rings.

For the purposes of the present invention, the expression "$C_5$- to $C_{20}$-cycloalkyl" covers unsubstituted and also substituted cycloalkyl groups, preferably $C_5$- to $C_7$-cycloalkyl groups, such as cyclopentyl, cyclohexyl, or cycloheptyl. In the case of substitution, these can bear 1, 2, 3, 4, or 5 substituents, preferably 1, 2, or 3. These substituents are then usually the abovementioned alkyl radicals.

For the purposes of the present invention, the expression "$C_6$- to $C_{20}$-aryl" covers unsubstituted and substituted aromatic radicals, e.g. phenyl, o-, m-, or p-tolyl, xylyl, or naphthyl. Substituents occurring here are usually the abovementioned alkyl radicals.

For the purposes the present invention, the expression "$C_7$- to $C_{20}$-aralkyl" covers alkyl groups substituted by aromatic radicals; examples of the substituted alkyl groups are benzyl, o-, m-, or p-methylbenzyl, 1-phenylethyl, 2-phenylethyl, 3-phenylpropyl, or 4-phenylbutyl.

The alkoxyvinylsilanes of monomer component (B3) bear not only the vinyl radical which has a polymerizable ethylenic double bond and which optionally has substitution by $R^1$, $R^2$, and/or $R^3$ but also one, two, or three —$OR^5$ radicals, which are preferably $C_1$- to $C_{20}$-alkyloxy radicals, in particular $C_1$- to $C_8$-alkyloxy radicals, especially $C_1$- to $C_4$-alkyloxy radicals, which can be identical or different, and it is preferable here that remaining free valencies of the silicon atom, if they exist, have been satisfied by $C_1$- to $C_4$-alkyl, $C_5$- to $C_7$-cycloalkyl, phenyl, and/or hydrogen, as substituents $R^4$.

In one preferred embodiment, the co- or terpolymer of the invention is obtainable from at least one trialkoxyvinylsilane of the general formula Ia

$$H_2C=CH-Si(OR^5)_3 \quad (Ia)$$

in which all three alkoxy radicals are identical and $R^5$ is as defined above, as component (B3).

Particularly preferred representatives of the compounds Ia are tri($C_1$- to $C_{20}$-alkyloxy)vinyl-silanes, in particular tri($C_1$- to $C_8$-alkyloxy)vinylsilanes, especially tri($C_1$- to $C_4$-alkyloxy)vinyl-silanes, in which the expression "alkyl" means, as mentioned above, $C_1$- to $C_{20}$-alkyl radicals, and also analogous hydrocarbyl radicals which have interruption by heteroatoms, such as oxygen, or which can have incorporated aromatic or heterocyclic rings.

Typical examples of compounds of the general formula I are vinyltrimethoxysilane, vinyltriethoxysilane, vinyltripropoxysilane, vinyltriisopropoxysilane, vinyltributoxysilane, vinyl-tris(β-methoxyethoxy)silane, vinylmethyldiethoxysilane, vinylethyldimethoxysilane, vinylcyclohexyldimethoxysilane, vinylphenyldimethoxysilane, vinyldimethylmonoethoxysilane, and vinylmethylphenylmonoethoxysilane.

It is preferable that the co- or terpolymer of the invention is obtainable via copolymerization of
(B1) from 5 to 60% by weight, in particular from 10 to 40% by weight, of at least one electron-deficient olefin,
(B2) from 0 to 80% by weight, preferably from 5 to 80% by weight, in particular from 15 to 70% by weight, of at least one olefin which bears, at its olefinic double bond, only hydrogen atoms and/or carbon atoms, without electron-withdrawing substituents, and
(B3) from 5 to 60% by weight, in particular from 15 to 50% by weight, of at least one alkoxyvinylsilane,
where the total of the % by weight values for components (B1), (B2), and (B3) is always 100% by weight.

The co- or terpolymer of the invention is in particular obtainable via copolymerization of
(B1) from 5 to 60% by weight, in particular from 10 to 40% by weight, of at least one anhydride of a monoethylenically unsaturated $C_4$- to $C_6$-dicarboxylic acid,
(B2) from 0 to 80% by weight, preferably from 5 to 80% by weight, in particular from 15 to 70% by weight, of an isobutene homo- or copolymer with a number-average molecular weight $M_n$ of from 100 to 500 000, and
(B3) from 5 to 60% by weight, in particular from 15 to 50% by weight, of at least one alkoxyvinylsilane, where the total of the % by weight values for components (B1), (B2), and (B3) is 100% by weight.

In one preferred embodiment, the co- or terpolymer of the invention has a structure which in essence alternates. In the polymer chain here there is usually a monomer unit (B1) respectively alternating with a monomer unit (B2) or with a monomer unit (B3). Any monomer unit (B2) and (B3) present here preferably has random distribution. The ratio between the monomer units (B1) to the entirety of (B2) and (B3) is mostly from 0.9:1.1 to 1.1:0.9.

In another embodiment, the distribution of the monomer units can be more random. By way of example, there can be an excess present of the electron-deficient olefins (B1), where the ratio between the monomer units (B1) and the entirety of (B2) and (B3) is from more than 1.1:0.9 to 1.5:0.5. However, it is also possible that there is a deficiency present of the electron-deficient olefins (B1), where the ratio between the monomer units (B1) and the entirety of (B2) and (B3) is from less than 0.9:1.1 to 0.5:1.5.

The co- or terpolymer of the invention generally has a number-average molecular weight $M_n$ of from 500 to 2 000 000, in particular from 750 to 200 000, especially from 1000 to 75 000 (determined by an analytical ultracentrifuge).

The co- or terpolymer of the invention generally has a polydispersity index (PDI) of from 1.5 to 15, in particular from 2.0 to 12, especially from 2.5 to 8.

As a function of content of monomer units of component (B2), the co- or terpolymer of the invention can take the form of brittle resin [predominantly for low contents of (B2)], or of viscous oil, or of soft resin [predominantly for high contents of (B2)].

The formula system below is intended to illustrate by way of example the formation of a typical representative of the co- or terpolymer of the invention (n=number of isobutene units in the polyisobutene used minus 2; PIB=remainder of structure of polyisobutene unit):

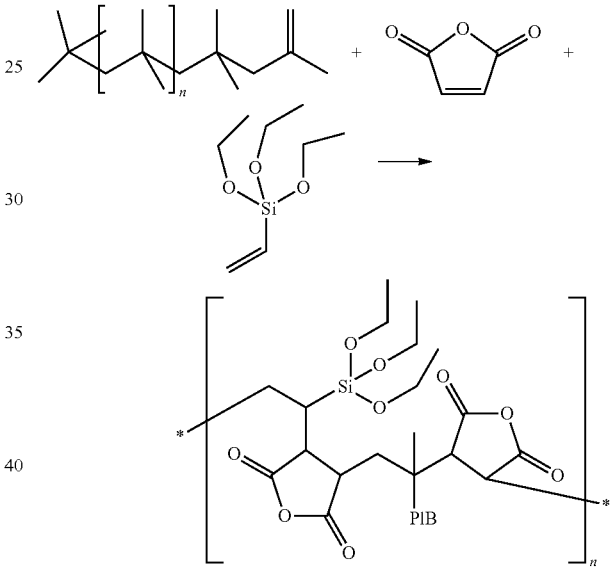

Component B) of the invention is obtainable via a process which is characterized in that components (B1), (B2), and (B3) are copolymerized with one another in bulk, in solution, or in suspension by a free-radical route.

The methods for free-radical bulk, solution, and suspension polymerization are well known to the person skilled in the art and do not therefore need to be explained in full detail here. By way of example, reference is made to overview literature, such as Houben-Weyl, Methoden der organischen Chemie [Methods of organic chemistry], 4th edition, G. Thieme Verlag, volume 14, and supplementary volume E20, and to the original literature cited therein. Pages 15-73 of volume E20 mention chemical initiators for the free-radical polymerization process, and pages 74-93 of same volume describe the initiation of a polymerization reaction by high-energy radiation. Handbook of Polymer Synthesis, 2nd edition, 2005, Marcel Dekker Verlag also provides a relevant summary. However, mention will be made below of those process parameters which can be critical for the conduct of the free-radical bulk, solution, or suspension polymerization of components (B1), (B2), and (B3) to give the co- or terpolymer (B) of the invention.

All of the polymerization processes mentioned generally operate with exclusion of oxygen, preferably in a stream of nitrogen. The polymerization reaction is usually conducted at temperatures of from 0 to 150° C., in particular at from 20 to 130° C., especially at from 40 to 120° C., and at a pressure of from 0.5 to 10 bar, in particular from 0.7 to 1.3 bar. The polymerization reaction can be carried out continuously or batchwise. In the case of the solution and suspension polymerization method, it is advantageous to use a solvent which is inert under polymerization conditions, an example being a hydrocarbon, such as toluene or xylene, a halogenated hydrocarbon, such as dichloromethane, or a mixture thereof, as solvent or suspension medium. In another variant, solvents (or a mixture of these) which can react under polymerization conditions are intentionally used (examples being ketones, such as acetone or butanone) in order to terminate free-radical chains and thus adjust molecular weight.

Polymerization initiators suitable here are by way of example peroxide compounds, such as tert-butyl peroxybenzoate, tert-butyl perpivalate, tert-butyl perneodecanoate, tert-butyl perethylhexanoate, tert-butyl perisobutyrate, di-tert-butyl peroxide, di-tert-amyl peroxide, diacetyl peroxydicarbonate, or dicyclohexyl peroxydicarbonate, or azo compounds, such as 2,2'-azobis(isobutyronitrile). These polymerization initiators can be used alone or in a mixture with one another. However, the polymerization reaction can also be initiated via radiation, for example via ultraviolet light, via gamma-radiation or via laser radiation.

Components (B) of the invention can moreover also be a thermally crosslinked co- or terpolymer which is a downstream product of the co- or terpolymer of the invention and which is obtained via heating of the co- or terpolymer (B) of the invention to temperatures above 80° C. (for example to from 100° C. to 120° C. or to from 120° C. to 150° C.) for at least 10 minutes. No significant amount of alcohol is eliminated here, and the crosslinking generally takes place substantially via formation of Si—O—Si bridges; alkoxy groups that may be eliminated are scavenged by the dicarboxylic anhydride groups, which are ring-opened in the process to give carboxylate groups. Exclusion of moisture can be advantageous, since water is not required in this step.

The formula system below is intended to illustrate by way of example a typical structure of this type of thermally crosslinked co- or terpolymer (PIB=remainder of structure of polyisobutene unit):

It is also possible to use, as (B), a downstream product of the co- or terpolymer of the invention which is obtainable via reaction of the co- or terpolymer of the invention with mono- or polyhydric alcohols and/or with mono- or polybasic amines. By way of example, appropriate, mostly very small, amounts of the alcohols and amines are brought into contact through wetting or spraying processes, by way of the gas phase or in liquid form, with the co- or terpolymer of the invention. However, another possibility is that the alcohols or amines are brought into contact with, and reacted with, a solution of the co- or terpolymer of the invention in an inert solvent, such as toluene. The reaction time here is from a few minutes to a few days, the temperatures used with amines usually being from 10° C. to 60° C., whereas a range which has proven successful in the case of alcohols is from 50° C. to 120° C. Here, there is generally not yet any crosslinking brought about via formation of Si—O—Si bridges. Examples of alcohols that can be used here are methanol, ethanol, propanol, isopropanol, tert-butanol, methoxyethanol, ethylene glycol and glycerol, and examples of amines that can be used here are mono-butylamine, diethylamine, trimethylamine, triethylamine, ethylenediamine, 3-(N,N-dimethyl-amino) propylamine, and also alkanolamines, such as triethanolamine or triisopropanolamine. The alcohols and amines can also comprise further functional groups, such as siloxane groups, for further modification of the polymer. Examples here are 3-aminopropyltriethoxysilane, 3-aminoethyltriethoxysilane, and 3-aminopropyltrimethoxysilane.

It is also possible to use polyethylene oxides or polypropylene oxides in a molecular weight range from 200 to 10 000. In one case the polymer chains are difunctional, i.e. have termination at both ends by an —OH group or —NH$_2$ group, the polymer being difunctional. In another case one end has been etherified, and therefore one chain end is represented by R—O— (where R is any desired hydrocarbon radical), and the other end here can be —OH or —NH$_2$, these polymers being monofunctional.

The reaction of monofunctional (monobasic and, respectively, monohydric) amines and alcohols initially proceed in essence without crosslinking, since the process in the solution produces neither gelling nor precipitation. Crosslinking with formation of Si—O—Si bonds can also take place as downstream reaction caused by prolonged heating, for example for from 1 to 3 hours or for from 2 to 8 hours, to relatively high temperatures, for example to from 50° C. to 90° C. or to from 70° C. to 150° C. The formula system below is intended to illustrate by way of example a typical structure of this type of substituted co- or terpolymer having ring-opened anhydride groups. (PIB=remainder of structure of polyisobutene unit):

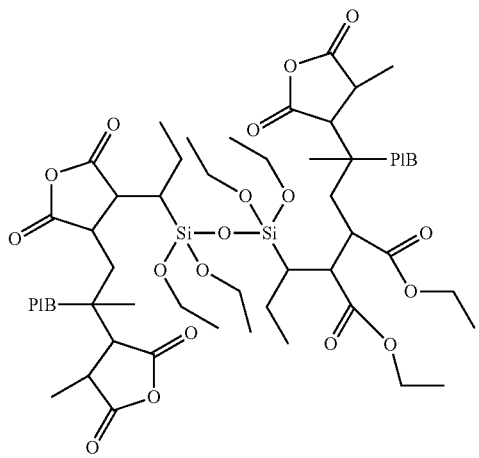

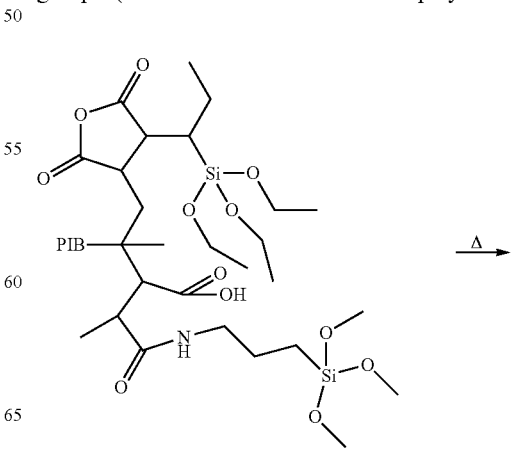

-continued

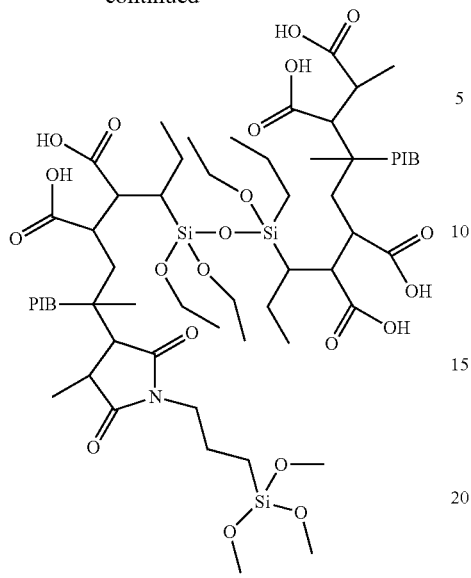

B) can moreover be a hydrolytically crosslinked co- or terpolymer which is a downstream product of the co- or terpolymer of the invention and which is obtainable via reaction of the co- or terpolymer of the invention with water. The water here can take the form of steam, atmospheric moisture, or very small amounts of liquid water when it is brought into contact with the co- or terpolymer of the invention. The reaction time here is from a few minutes to a few days, and the usual reaction temperatures are from 10° C. to 60° C. Here again the crosslinking is generally brought about substantially via formation of Si—O—Si bridges; the dicarboxylic anhydride groups are then ring-opened hydrolytically to give carboxylate groups, forming free carboxy groups.

The formula scheme below is intended to illustrate by way of example a typical structure of this type of hydrolytically crosslinked co- or terpolymer having ring-opened anhydride groups with preceding crosslinking by way of Si—O—Si bridges (PIB=residual structure of polyisobutene unit):

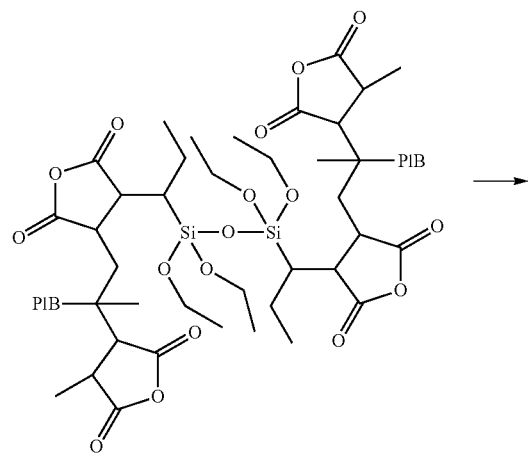

-continued

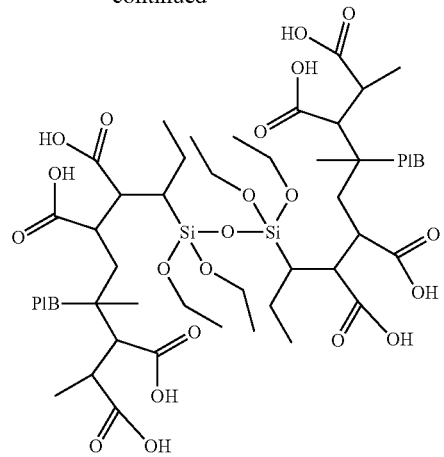

When polyfunctional (di- or polybasic or, respectively, di- or polyhydric) amines and alcohols are reacted, the crosslinking takes place in a simple manner; in solution, gelling and precipitation are observed.

Other equally suitable downstream products of the co- or terpolymer of the invention are provided by a co- or terpolymer which has been crosslinked by way of polyamines and/or polyols and which is obtainable via reaction of the co- or terpolymer of the invention with polyamines (polybasic amines) and/or with polyols (polyhydric alcohols). The reaction time here is from a few minutes to a few days, and the temperatures used are usually from 10° C. to 140° C. The general process here is then that the dicarboxylic anhydride groups are ring-opened to give carbonamide groups or carboxylic ester groups, with resultant crosslinking. The carbonamide groups here can also be cyclized with a free carboxylic acid to give imides. The crosslinking can also be brought about via formation of Si—O—Si bridges.

Other examples of downstream products of the co- or terpolymer of the invention are an aqueous alkaline, alcoholic alkaline, alcoholic aminic, or aqueous basic co- or terpolymer preparation which is obtainable via treatment of the co- or terpolymer of the invention with aqueous or alcoholic alkali metal hydroxide solution or with aqueous or alcoholic amine solution. The treatment time here is mostly from 10 to 100 minutes, usually at from 20° C. to 60° C. The product here is generally genuine solutions, emulsions, dispersions, or gel-like preparations of the co- or terpolymer. The siloxane groups here are mostly substantially hydrolyzed to give silicate groups (—$SiO_3^{3-}$), and the dicarboxylic anhydride groups are mostly ring-opened hydrolytically to give carboxylate groups (—$COO^-$). If an aqueous amine solution is used, some or all of the latter groups take the form of carboxamide groups. Alkali metal hydroxide solutions that can be used here are in particular aqueous or ethanolic sodium hydroxide solution or aqueous or ethanolic potassium hydroxide solution. Examples of amines that can be used here are monobutylamine, diethylamine, trimethylamine, triethylamine, di- or polyamines, such as ethylenediamine, or 3-(N,N-dimethylamino)propylamine, or else alkanolamines, such as triethanolamine or triisopropanolamine; if aqueous di- or polyamines are used, to the extent that only one amine function is reactive the products mostly have betaine-like structures. The resultant alcoholic alkaline or alcoholic basic, or aqueous alkaline or aqueous basic co- or terpolymer preparation can generally be stored for a prolonged period.

Preparations of this type (aqueous or alcoholic) can preferably—prior to incorporation into the respective polyamide A)—be spray-dried or otherwise dried.

The formula system below is intended to illustrate by way of example two typical structures of this type of co- or terpolymer preparation hydrolyzed in an aqueous system—firstly by aqueous sodium hydroxide solution, and secondly by aqueous 3-(N,N-dimethylamino)propylamine (PIB=remainder of structure of polyisobutene unit):

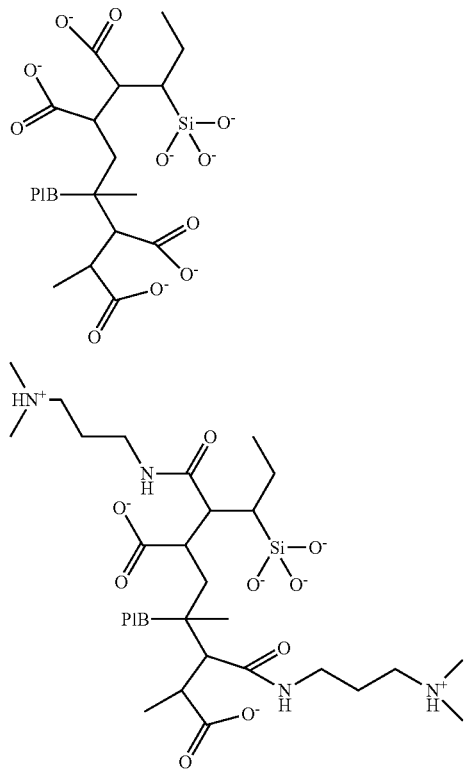

The molding compositions of the invention can comprise, as component C), from 0 to 50% by weight, preferably from 1 to 40% by weight, in particular from 5 to 35% by weight, of a fibrous or particulate filler, or a mixture thereof.

Fibrous or particulate fillers C) which may be mentioned are carbon fibers, glass fibers, glass beads, amorphous silica, calcium silicate, calcium metasilicate, magnesium carbonate, kaolin, chalk, powdered quartz, mica, barium sulfate and feldspar, used in amounts of from 1 to 50% by weight, in particular from 5 to 40% by weight, preferably from 10 to 40% by weight.

Preferred fibrous fillers which may be mentioned are carbon fibers, aramid fibers and potassium titanate fibers, and particular preference is given to glass fibers in the form of E glass. These may be used as rovings or in the commercially available forms of chopped glass.

The fibrous fillers may have been surface-pretreated with a silane compound to improve compatibility with the thermoplastic.

Suitable silane compounds have the general formula:

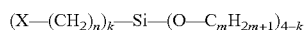

where:

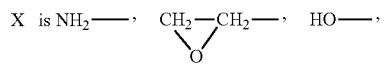

n is a whole number from 2 to 10, preferably 3 to 4,
m is a whole number from 1 to 5, preferably 1 to 2, and
k is a whole number from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which comprise a glycidyl group as substituent X.

The amounts of the silane compounds generally used for surface-coating are from 0.01 to 2% by weight, preferably from 0.025 to 1.0% by weight, and in particular from 0.05 to 0.5% by weight (based on C)).

Long glass fibers are also suitable as component C1) and can be used in the form of rovings. The diameter of the glass fibers used in the form of rovings in the invention is from 6 to 20 μm, preferably from 10 to 18 μm, and the cross section of these glass fibers is round, oval, or angular. In particular, E glass fibers are used in the invention. However, it is also possible to use any of the other types of glass fiber, examples being A, C, D, M, S, and R glass fibers and any desired mixtures thereof, or a mixture with E glass fibers.

It is preferable that the L/D (length/diameter) ratio is from 100 to 4000, in particular from 350 to 2000, and very particularly from 350 to 700.

Acicular mineral fillers are also suitable.

For the purposes of the invention, acicular mineral fillers are mineral fillers with strongly developed acicular character. An example is acicular wollastonite. The mineral preferably has an L/D (length/diameter) ratio of from 8:1 to 35:1, preferably from 8:1 to 11:1. The mineral filler may optionally have been pretreated with the abovementioned silane compounds, but the pretreatment is not essential.

Other fillers which may be mentioned are kaolin, calcined kaolin, wollastonite, talc and chalk, and also lamellar or acicular nanofillers, the amounts of these preferably being from 0.1 to 10%. Materials preferred for this purpose are boehmite, bentonite, montmorillonite, vermiculite, hectorite, and laponite. The lamellar nanofillers are organically modified by prior-art methods, to give them good compatibility with the organic binder. Addition of the lamellar or acicular nanofillers to the inventive nanocomposites gives a further increase in mechanical strength.

The molding compositions can comprise, as component D), up to 50% by weight, preferably up to 20% by weight, of other additives.

The molding compositions of the invention can comprise, as component D), from 0.05 to 3% by weight, preferably from 0.1 to 1.5% by weight, and in particular from 0.1 to 1% by weight, of a lubricant.

Preference is given to the Al, alkali metal, or alkaline earth metal salts, or esters or amides of fatty acids having from 10 to 44 carbon atoms, preferably having from 12 to 44 carbon atoms.

The metal ions are preferably alkaline earth metal and Al, particular preference being given to Ca or Mg.

Preferred metal salts are Ca stearate and Ca montanate, and also Al stearate.

It is also possible to use a mixture of various salts, in any desired mixing ratio.

The carboxylic acids can be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols can be monohydric to tetrahydric. Examples of alcohols are n-butanol or n-octanol, stearyl alcohol, ethylene glycol, propylene glycol, neopentyl glycol, pentaerythritol, preference being given to glycerol and pentaerythritol.

The aliphatic amines can be mono- to tribasic. Examples of these are stearylamine, ethylenediamine, propylenediamine, hexamethylenediamine, di(6-aminohexyl)amine, particular preference being given to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use a mixture of various esters or amides, or of esters with amides in combination, in any desired mixing ratio.

The inventive molding compositions can comprise, as component D), from 0.05 to 3% by weight, preferably from 0.1 to 1.5% by weight, and in particular from 0.1 to 1% by weight, of a Cu stabilizer, preferably a Cu(I) halide, in particular in a mixture with an alkali metal halide, preferably KI, in particular in the ratio 1:4, or of a sterically hindered phenol, or a mixture of these.

Preferred salts of monovalent copper used are cuprous acetate, cuprous chloride, cuprous bromide, and cuprous iodide. The materials comprise these in amounts of from 5 to 500 ppm of copper, preferably from 10 to 250 ppm, based on polyamide.

The advantageous properties are in particular obtained if the copper is present with molecular distribution in the polyamide. This is achieved if a concentrate comprising the polyamide, and comprising a salt of monovalent copper, and comprising an alkali metal halide in the form of a solid, homogeneous solution is added to the molding composition. By way of example, a typical concentrate is composed of from 79 to 95% by weight of polyamide and from 21 to 5% by weight of a mixture composed of copper iodide or copper bromide and potassium iodide. The copper concentration in the solid homogenous solution is preferably from 0.3 to 3% by weight, in particular from 0.5 to 2% by weight, based on the total weight of the solution, and the molar ratio of cuprous iodide to potassium iodide is from 1 to 11.5, preferably from 1 to 5.

Suitable polyamides for the concentrate are homopolyamides and copolyamides, in particular nylon-6 and nylon-6,6.

Suitable sterically hindered phenols D) are in principle any of the compounds having a phenolic structure and having at least one bulky group on the phenolic ring.

By way of example, compounds of the formula

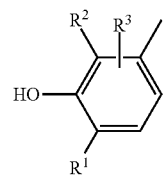

can preferably be used, in which:

$R^1$ and $R^2$ are an alkyl group, a substituted alkyl group, or a substituted triazole group, where the radicals $R^1$ and $R^2$ can be identical or different, and $R^3$ is an alkyl group, a substituted alkyl group, an alkoxy group, or a substituted amino group.

Antioxidants of the type mentioned are described by way of example in DE-A 27 02 661 (U.S. Pat. No. 4,360,617).

Another group of preferred sterically hindered phenols is those derived from substituted benzenecarboxylic acids, in particular from substituted benzenepropionic acids.

Particularly preferred compounds from this class are compounds of the formula

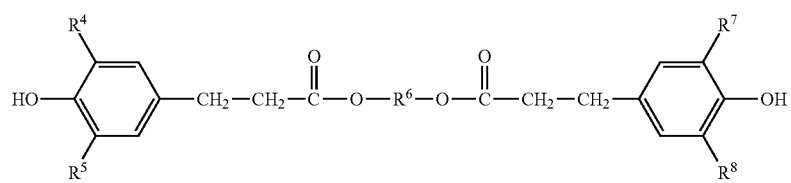

where $R^4$, $R^5$, $R^7$, and $R^8$, independently of one another, are $C_1$-$C_8$-alkyl groups which themselves may have substitution (at least one of these being a bulky group), and $R^6$ is a divalent aliphatic radical which has from 1 to 10 carbon atoms and whose main chain may also have C—O bonds.

Preferred compounds corresponding to these formulae are

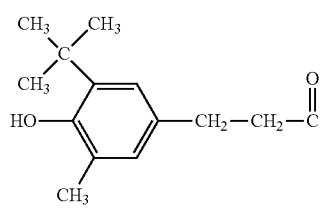 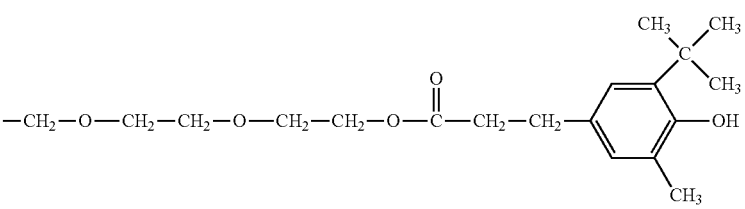

(Irganox® 245 from BASF SE)

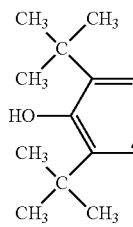 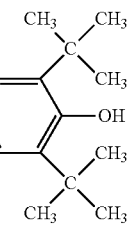

(Irganox® 259 from BASF SE)

All of the following should be mentioned as examples of sterically hindered phenols:

2,2'-methylenebis(4-methyl-6-tert-butylphenol), 1,6-hexanediol bis[3-(3,5-di-tert-butyl-4-hydroxyphenyl)propionate], pentaerythrityl tetrakis[3-(3,5-di-tert-butyl-4-hydroxyphenyl)-propionate], distearyl 3,5-di-tert-butyl-4-hydroxybenzylphosphonate, 2,6,7-trioxa-1-phosphabicyclo[2.2.2]oct-4-ylmethyl 3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxybenzyl)benzene, 4,4'-methylenebis(2,6-di-tert-butylphenol), 3,5-di-tert-butyl-4-hydroxybenzyldimethylamine.

Compounds which have proven particularly effective and which are therefore used with preference are 2,2'-methylenebis(4-methyl-6-tert-butylphenol), 1,6-hexanediol bis(3,5-di-tert-butyl-4-hydroxyphenyl]propionate (Irganox® 259), pentaerythrityl tetrakis[3-(3,5-di-tert-butyl-4-hydroxyphenyl)propionate], and also N,N'-hexamethylenebis-3,5-di-tert-butyl-4-hydroxy-hydrocinnamide (Irganox® 1098), and the product Irganox® 245 described above from BASF SE, which has particularly good suitability.

The amounts comprised of the antioxidants D), which can be used individually or in the form of mixtures, are from 0.05 up to 3% by weight, preferably from 0.1 to 1.5% by weight, in particular from 0.1 to 1% by weight, based on the total weight of the molding compositions A) to D).

In some cases, sterically hindered phenols having no more than one sterically hindered group in ortho-position with respect to the phenolic hydroxy group have proven particularly advantageous, in particular when colorfastness is assessed on storage in diffuse light over prolonged periods.

The molding compositions of the invention can comprise, as component D), from 0.05 to 5% by weight, preferably from 0.1 to 2% by weight, and in particular from 0.25 to 1.5% by weight, of a nigrosin.

Nigrosins are generally a group of black or gray phenazine dyes (azine dyes) related to the indulines and taking various forms (water-soluble, oleosoluble, spirit-soluble), used in wool dyeing and wool printing, in black dyeing of silks, and in the coloring of leather, of shoe creams, of varnishes, of plastics, of stoving lacquers, of inks, and the like, and also as microscopy dyes.

Nigrosins are obtained industrially via heating of nitrobenzene, aniline, and aniline hydrochloride with metallic iron and $FeCl_3$ (the name being derived from the Latin niger=black).

Component D) can be used in the form of free base or else in the form of salt (e.g. hydrochloride).

Further details concerning nigrosins can be found by way of example in the electronic encyclopedia Römpp Online, Version 2.8, Thieme-Verlag Stuttgart, 2006, keyword "Nigrosin".

Examples of other conventional additives D) are amounts of up to 25% by weight, preferably up to 20% by weight, of elastomeric polymers (also often called impact modifiers, elastomers, or rubbers).

These are very generally copolymers which have preferably been built up from at least two of the following monomers: ethylene, propylene, butadiene, isobutene, isoprene, chloroprene, vinyl acetate, styrene, acrylonitrile and acrylates and/or methacrylates having from 1 to 18 carbon atoms in the alcohol component.

Polymers of this type are described, for example, in Houben-Weyl, Methoden der organischen Chemie [Methods of organic chemistry], Vol. 14/1 (Georg-Thieme-Verlag, Stuttgart, Germany, 1961), pages 392-406, and in the monograph by C. B. Bucknall, "Toughened Plastics" (Applied Science Publishers, London, UK, 1977).

Some preferred types of such elastomers are described below.

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[$5.2.1.0^{2,6}$]-3,8-decadiene, or a mixture of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These monomers comprising dicarboxylic acid derivatives or comprising epoxy groups are preferably incorporated into the rubber by adding to the monomer mixture monomers comprising dicarboxylic acid groups and/or epoxy groups and having the general formulae I, II, III or IV $$R^1C(COOR^2)=C(COOR^3)R^4 \tag{I}$$

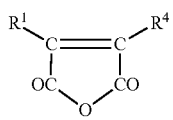  (II)

$$CHR^7=CH-(CH_2)_m-O-(CHR^6)_g-CH-CHR^5 \tag{III}$$
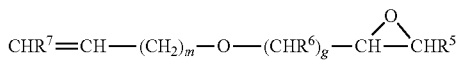

$$CH_2=CR^9-COO-(CH^2)_p-CH-CHR^8 \tag{IV}$$
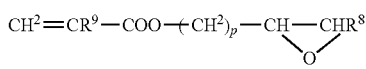

where $R^1$ to $R^9$ are hydrogen or alkyl groups having from 1 to 6 carbon atoms, and m is a whole number from 0 to 20, g is a whole number from 0 to 10 and p is a whole number from 0 to 5.

$R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates comprising epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers comprising epoxy groups and/or methacrylic acid and/or monomers comprising anhydride groups, the remaining amount being (meth)acrylates.

Particular preference is given to copolymers composed of from 50 to 98% by weight, in particular from 55 to 95% by weight, of ethylene,
from 0.1 to 40% by weight, in particular from 0.3 to 20% by weight, of glycidyl acrylate and/or glycidyl methacrylate, (meth)acrylic acid and/or maleic anhydride, and
from 1 to 45% by weight, in particular from 5 to 40% by weight, of n-butyl acrylate and/or 2-ethylhexyl acrylate.

Other preferred (meth)acrylates are the methyl, ethyl, propyl, isobutyl and tert-butyl esters.

Besides these, comonomers which may be used are vinyl esters and vinyl ethers.

The ethylene copolymers described above may be prepared by processes known per se, preferably by random copolymerization at high pressure and elevated temperature. Appropriate processes are well-known.

Other preferred elastomers are emulsion polymers whose preparation is described, for example, by Blackley in the monograph "Emulsion Polymerization". The emulsifiers and catalysts which can be used are known per se.

In principle it is possible to use homogeneously structured elastomers or else those with a shell structure. The shell-type structure is determined by the sequence of addition of the individual monomers; the morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell composed of a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, carboxy, latent carboxy, amino and amide groups, and also functional groups which may be introduced by concomitant use of monomers of the general formula

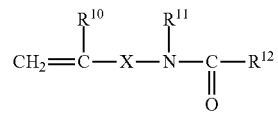

where the substituents can be defined as follows:
$R^{10}$ is hydrogen or a $C_1$-$C_4$-alkyl group,
$R^{11}$ is hydrogen, a $C_1$-$C_8$-alkyl group or an aryl group, in particular phenyl,
$R^{12}$ is hydrogen, a $C_1$-$C_{10}$-alkyl group, a $C_6$-$C_{12}$-aryl group, or —$OR^{13}$,
$R^{13}$ is a $C_1$-$C_8$-alkyl group or a $C_6$-$C_{12}$-aryl group, which can optionally have substitution by groups that comprise O or by groups that comprise N,
X is a chemical bond, a $C_1$-$C_{10}$-alkylene group, or a $C_6$-$C_{12}$-arylene group, or

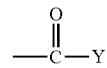

Y is O—Z or NH—Z, and
Z is a $C_1$-$C_{10}$-alkylene or $C_6$-$C_{12}$-arylene group.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
| --- | --- | --- |
| I | 1,3-butadiene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope composed of monomers as described under I and II for the core, second envelope as described under I or IV for the envelope |

Instead of graft polymers whose structure has more than one shell, it is also possible to use homogeneous, i.e. single-shell, elastomers composed of 1,3-butadiene, isoprene and n-butyl acrylate or of copolymers of these. These products, too, may be prepared by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core composed of n-butyl acrylate or based on butadiene and with an outer envelope composed of the abovementioned copolymers, and copolymers of ethylene with comonomers which supply reactive groups.

The elastomers described may also be prepared by other conventional processes, e.g. by suspension polymerization.

Preference is also given to silicone rubbers, as described in DE-A 37 25 576, EP-A 235 690, DE-A 38 00 603 and EP-A 319 290.

It is, of course, also possible to use mixtures of the types of rubber listed above.

The thermoplastic molding compositions of the invention can comprise, as component D), conventional processing aids, such as stabilizers, oxidation retarders, agents to counteract decomposition due to heat and decomposition due to ultraviolet light, lubricants and mold-release agents, colorants, such as dyes and pigments, nucleating agents, plasticizers, flame retardants, etc.

Examples which may be mentioned of oxidation retarders and heat stabilizers are sterically hindered phenols and/or phosphites and amines (e.g. TAD), hydroquinones, aromatic secondary amines, such as diphenylamines, various substituted members of these groups, and mixtures of these in concentrations of up to 1% by weight, based on the weight of the thermoplastic molding compositions.

UV stabilizers which may be mentioned, and are generally used in amounts of up to 2% by weight, based on the molding composition, are various substituted resorcinols, salicylates, benzotriazoles, and benzophenones.

Colorants which may be added are inorganic pigments, such as titanium dioxide, ultramarine blue, iron oxide, and carbon black, and also organic pigments, such as phthalocyanines, quinacridones and perylenes, and also dyes, such as anthraquinones.

Nucleating agents which may be used are sodium phenylphosphinate, alumina, silica, and preferably talc.

The thermoplastic molding compositions of the invention may be prepared by methods known per se, by mixing the starting components in conventional mixing apparatus, such as screw extruders, Brabender mixers or Banbury mixers, and then extruding them. The extrudate may then be cooled and comminuted. It is also possible to premix individual components and then to add the remaining starting materials individually and/or likewise in a mixture. The mixing temperatures are generally from 230 to 320° C.

In another preferred procedure, component B), and also optionally C) and D), can be mixed with a prepolymer, compounded, and pelletized. The resultant pellets are then solid-phase condensed under an inert gas, continuously or batch-wise, at a temperature below the melting point of component A) until the desired viscosity has been reached.

The long-glassfiber-reinforced polyamide molding compositions of the invention can be produced by the known processes for producing elongate long-fiber-reinforced pellets, in particular by pultrusion processes, where the continuous fiber strand (roving) is completely saturated by the polymer melt and is then cooled and chopped. The pellet length of the elongate long-fiber-reinforced pellets thus obtained is from 3 to 25 mm, in particular from 5 to 14 mm, and they can be further processed to produce moldings by the usual processing methods (e.g. injection molding, compression molding).

The preferred L/D ratio of the pellets after pultrusion is from 2 to 8, in particular from 3 to 4.5.

Particularly good properties can be achieved in the molding, using non-aggressive processing methods. In this context, non-aggressive means especially that excessive fiber breakage and the attendant severe reduction of fiber length are substantially avoided. In the case of injection molding, this means that it is preferable to use screws with large diameter and low compression ratio, in particular smaller than 2, and to use generously dimensioned nozzle channels and feed channels. A supplementary requirement is that high cylinder temperatures are used to achieve rapid melting of the elongate pellets (contact heating) and that the fibers are not too severely comminuted by excessive shear. If these measures are implemented, the invention gives moldings which have higher average fiber length than comparable moldings produced from short-fiber-reinforced molding compositions. This gives improved properties, in particular in relation to tensile strength, modulus of elasticity, ultimate tensile strength, and notched impact resistance.

Fiber length after processing of the molding, e.g. via injection molding, is usually from 0.5 to 10 mm, in particular from 1 to 3 mm.

The thermoplastic molding compositions of the invention feature good hydrolysis resistance together with good mechanical properties, and also significantly improved surface, and also thermal stability.

These materials are suitable for producing fibers, foils, and moldings of any type. Some examples are cited: cylinder head covers, motorcycle covers, intake pipes, charge air cooler caps, plug connectors, gearwheels, fan wheels, and cooling water tanks.

In the electrical and electronics sector, improved-flow polyamides can be used to produce plugs, plug parts, plug connectors, membrane switches, circuit board modules, microelectronic components, coils, I/O plug connectors, plugs for circuit boards (PCBs), plugs for flexible circuits (FPCs), plugs for flexible integrated circuits (FFCs), high speed plug connections, terminal strips, connector plugs, device connectors, cable harness components, circuit mounts, circuit mount components, three-dimensionally injection-molded circuit mounts, electrical connection elements, and mechatronic components.

Possible uses in automobile interiors are for dashboards, steering column switches, seat components, headrests, center consoles, gearbox components, and door modules, and possible uses in automobile exteriors are for door handles, exterior mirror components, windshield wiper components, windshield wiper protective housings, grilles, roof rails, sunroof frames, engine covers, cylinder head covers, intake pipes (in particular intake manifolds), windshield wipers, and also external bodywork components.

Possible uses of improved-flow polyamides in the kitchen and household sector are for producing components for kitchen devices, e.g. fryers, smoothing irons, knobs, and also applications in the garden and leisure sector, e.g. components for irrigation systems, or garden devices, and door handles.

EXAMPLES

The following components were used:

Component A/1

Nylon-6,6 with intrinsic viscsosity IV 148 ml/g, measured on a 0.5% strength by weight solution in 96% strength by weight sulfuric acid at 25° C. to ISO 307. (Ultramid® A27 from BASF SE was used).

Production of Component B

Polymerization of maleic anhydride, polyisobutene, and vinyltriethoxysilane 380 g of vinyltriethoxysilane, 80 ml of toluene, 200 g of commercially available reactive polyisobutene with $M_n$=1000 (Glissopal® 1000), and 200 g of maleic anhydride were used as initial charge in a 500 ml four-necked flask and heated to an internal temperature of 95° C. Nitrogen gas was introduced into the resultant reaction mixture by way of an inlet tube. 4 g of tert-butyl peroxybenzoate dissolved in 40 ml of toluene were added over a period of 4 hours. During the course of the reaction, the cloudy mixture became clear, oily, and homogeneous (solids content: 66% by weight). For work-up, the solvent was removed by distillation on a rotary evaporator at 130° C. and at from 500 to 8 mbar. This gave 115 of the desired terpolymer in the form of a viscous oil which rapidly solidified to give a brittle, glassy residue which could be characterized by $^1$H NMR spectroscopy.

$^1$H NMR (400 MHz, 16 scans, $CDCl_3$): the signals for maleic anhydride ($\delta$=7.00 ppm), and also for the double bonds of vinylsiloxane ($\delta$=6.13 ppm, 6.02 ppm, and 5.90 ppm), and for polyisobutene ($\delta$=5.16 ppm, 4.84 ppm and 4.64 ppm) had disappeared. Signals that remained present were those for the ethoxy function ($\delta$=3.84 ppm and 1.24 ppm), and for polyisobutene ($\delta$=1.42 ppm, 1.11 ppm and 0.99 ppm). New broad signals attributable to the new polymer chain were present ($\delta$=3.4 ppm to 2.4 ppm: $CH_2$—CH—CO; $\delta$=2.2 ppm to 1.5 ppm: $CH_2$—CH—CO).

Component C

Glass Fibers

Component D/1

Calcium stearate

Component D/2

CuI/KI in a ratio of 1:4 (20% strength masterbatch in PA6)

Component D/3

40% strength PA6 masterbatch using nigrosin

The molding compositions were produced in a ZSK 30 with throughput 25 kg/h and a flat temperature profile: about 280° C.

The following tests were carried out:

Tensile test to ISO 527, mechanical properties prior to and after hydrolytic aging at 130° C. in a 50:50 mixture made of water and Glysantin® G48.

IV: c=5 g/l in 96% strength sulfuric acid, to ISO 307

The tables give the constitutions of the molding compositions and the results of the tests.

TABLE 1

| Ex. | A (%) | C (%) | D/1 (%) | D/3 (%) | D/2 (%) | B (%) |
|---|---|---|---|---|---|---|
| 1comp. | 67.45 | 30 | 0.35 | 1.9 | 0.3 | — |
| 1 | 66.95 | 30 | 0.35 | 1.9 | 0.3 | 0.7 |

TABLE 2

| | Mechanical properties after hydrolytic aging | | | |
|---|---|---|---|---|
| Ex. | 0 h | 250 h | 500 h | 1000 h |
| | Modulus of elasticity, [MPa] | | | |
| 1comp. | 9980 | 4570 | 4670 | 3880 |
| 1 | 9510 | 4420 | 4410 | 4050 |
| | Tensile strength [MPa] (tensile stress at break) | | | |
| 1comp. | 193 | 86 | 74 | 23 |
| 1 | 189 | 88 | 77 | 28 |
| | Elongation at break, [%] (tensile strain at break) | | | |
| 1comp. | 3.7 | 4.2 | 3.0 | 0.7 |
| 1 | 3.8 | 4.6 | 2.9 | 0.8 |

The invention claimed is:

1. A thermoplastic molding composition comprising:
(A) from 10 to 99.9% by weight of a thermoplastic polyamide;
(B) from 0.1 to 20% by weight of a terpolymer obtainable via copolymerization of:
(B1) 1% to 70% by weight of at least one electron-deficient olefin;
(B2) up to 85% by weight of at least one olefin which on its olefinic double bond carries only hydrogen atoms and/or carbon atoms without electron-withdrawing substituents and which is an isobutene homopolymer or copolymer having a number-average molecular weight $M_n$ of 100 to 500,000; and
(B3) 1% to 70% by weight of at least one alkoxyvinylsilane,
wherein B1, B2, and B3 are present;
(C) from 0 to 50% by weight of a fibrous or particulate filler or a mixture of these;
(D) from 0 to 50% by weight of other additives,
wherein the total of the percentages by weight of components (A) to (D) does not exceed 100% by weight.

2. The thermoplastic molding composition according to claim 1 wherein the electron-deficient olefin as component (B1) comprises at least one olefin which bears at its olefinic double bond at least one electron-withdrawing substituent selected from the group consisting of —CO—, —CN, —NO₂, and —SO₂—.

3. The thermoplastic molding composition according to claim 1 wherein the electron-deficient olefin as component (B1) comprises at least one anhydride of a monoethylenically unsaturated $C_4$ to $C_6$ dicarboxylic acid.

4. The thermoplastic molding composition according to claim 1 wherein the alkoxyvinylsilane as component (B3) comprises at least one compound according to the following general formula (I):

wherein m is 0, 1, or 2, and
$R^1$, $R^2$, $R^3$, and $R^4$ may be identical or different and are hydrogen, $C_1$ to $C_{20}$ alkyl, $C_5$ to $C_{20}$ cycloalkyl, $C_6$ to $C_{20}$ aryl, or $C_7$ to $C_{20}$ aralkyl radicals, and each $R^5$ may be identical or different and is $C_1$ to $C_{20}$ alkyl, $C_5$ to $C_{20}$ cycloalkyl, $C_6$ to $C_{20}$ aryl, or $C_7$ to $C_{20}$ aralkyl radicals.

5. The thermoplastic molding composition according to claim 1 wherein the alkoxyvinylsilane as component (B3) comprises at least one compound according to the following general formula (Ia):

6. The thermoplastic molding composition according to claim 1 wherein (B) is obtainable via copolymerization of:
(B1) from 5% to 60% by weight of at least one anhydride of a monoethylenically unsaturated $C_4$ to $C_6$ dicarboxylic acid;
(B2) up to 80% by weight of an isobutene homopolymer or copolymer having a number-average molecular weight $M_n$ of 100 to 500,000; and
(B3) from 5% to 60% by weight of at least one alkoxyvinylsilane,
wherein (B1), (B2), and (B3) are present, and
wherein the total of the percentages by weight of components (B1), (B2), and (B3) is 100% by weight.

7. The thermoplastic molding composition according to claim 1 comprising:
from 20 to 98% by weight of (A),
from 0.1 to 10% by weight of (B),
from 1 to 40% by weight of (C), and
from 0 to 40% by weight of (D).

8. The thermoplastic molding composition according to claim 7 wherein the electron-deficient olefin as component (B1) comprises at least one olefin which bears at its olefinic double bond at least one electron-withdrawing substituent selected from the group consisting of —CO—, —CN, —NO₂, and —SO₂—.

9. The thermoplastic molding composition according to claim 8 wherein the electron-deficient olefin as component (B1) comprises at least one anhydride of a monoethylenically unsaturated $C_4$ to $C_6$ dicarboxylic acid.

10. The thermoplastic molding composition according to claim 9 wherein the alkoxyvinylsilane as component (B3) comprises at least one compound according to the following general formula (I):

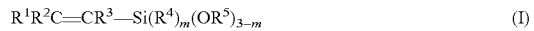

wherein m is 0, 1, or 2, and
$R^1$, $R^2$, $R^3$, and $R^4$ may be identical or different and are hydrogen, $C_1$ to $C_{20}$ alkyl, $C_5$ to $C_{20}$ cycloalkyl, $C_6$ to $C_{20}$ aryl, or $C_7$ to $C_{20}$ aralkyl radicals, and each $R^5$ may be identical or different and is $C_1$ to $C_{20}$ alkyl, $C_5$ to $C_{20}$ cycloalkyl, $C_6$ to $C_{20}$ aryl, or $C_7$ to $C_{20}$ aralkyl radicals.

11. The thermoplastic molding composition according to claim 10 wherein the alkoxyvinylsilane as component (B3) comprises at least one compound according to the following general formula (Ia):

12. The thermoplastic molding composition according to claim 11 wherein (B) is obtainable via copolymerization of:
(B1) from 5% to 60% by weight of at least one anhydride of a monoethylenically unsaturated $C_4$ to $C_6$ dicarboxylic acid;
(B2) up to 80% by weight of an isobutene homopolymer or copolymer having a number-average molecular weight $M_n$ of 100 to 500,000; and
(B3) from 5% to 60% by weight of at least one alkoxyvinylsilane,
wherein (B1), (B2), and (B3) are present, and
wherein the total of the percentages by weight of components (B1), (B2), and (B3) is 100% by weight.

13. A process for producing a fiber, a foil, or a molding which comprises utilizing the thermoplastic molding composition according to claim 1.

14. A fiber, a foil, or a molding of any type obtainable from the thermoplastic molding composition according to claim 1.

* * * * *